(12) United States Patent
Schulze et al.

(10) Patent No.: US 11,577,671 B2
(45) Date of Patent: Feb. 14, 2023

(54) ABSORBING SOUND INSULATION MOTOR TRIM ELEMENT

(71) Applicant: ADLER PELZER HOLDING GMBH, Hagen (DE)

(72) Inventors: Volkmar Schulze, Schierling (DE); Helmut Becker, Bochum (DE); Volker Kursch, Essen (DE); Maurizio Tarello, Caluso (IT); Norbert Nicolai, Schermbeck-Gahlen (DE)

(73) Assignee: Adler Pelzer Holding GMBH, Hagen (DE)

( * ) Notice: Subject to any disclaimer, the term of this patent is extended or adjusted under 35 U.S.C. 154(b) by 0 days.

(21) Appl. No.: 16/338,059

(22) PCT Filed: Nov. 1, 2017

(86) PCT No.: PCT/DE2017/100925
§ 371 (c)(1),
(2) Date: Mar. 29, 2019

(87) PCT Pub. No.: WO2018/082743
PCT Pub. Date: May 11, 2018

(65) Prior Publication Data
US 2020/0023793 A1    Jan. 23, 2020

(30) Foreign Application Priority Data
Nov. 4, 2016 (EP) .................................. 16197260

(51) Int. Cl.
*B60R 13/08* (2006.01)
*B32B 5/02* (2006.01)
(Continued)

(52) U.S. Cl.
CPC .......... *B60R 13/0815* (2013.01); *B32B 5/022* (2013.01); *B32B 5/145* (2013.01);
(Continued)

(58) Field of Classification Search
CPC ..... B60R 13/0815; B32B 5/022; B32B 5/145; B32B 5/20; B32B 5/245; B32B 5/32;
(Continued)

(56) References Cited

U.S. PATENT DOCUMENTS 5,665,943 A * 9/1997 D'Antonio ................ E04B 1/86
181/286
6,499,797 B1 12/2002 Bohm et al.
2010/0066121 A1 * 3/2010 Gross ................... G10K 11/162
296/146.5

FOREIGN PATENT DOCUMENTS

DE      39 05 607 A1    8/1990
DE   102008014261 A1 *  9/2009 ........... B29C 44/086
(Continued)

OTHER PUBLICATIONS

Espacenet Translation of EP-0995667-B1 (Year: 2020).*
(Continued)

*Primary Examiner* — Michael Zhang
(74) *Attorney, Agent, or Firm* — Nexsen Pruet, PLLC; Seth Hudson

(57) ABSTRACT

The invention relates to a method for producing an absorbing sound insulation motor vehicle trim element having a four-layered structure made from a first foam layer, a second foam layer, a non-woven foam layer and a non-woven fabric layer. The invention further relates to an absorbing sound insulation motor vehicle trim element.

2 Claims, 4 Drawing Sheets

(51) Int. Cl.
  *B32B 5/14*   (2006.01)
  *B32B 5/20*   (2006.01)
  *B32B 5/24*   (2006.01)
  *B32B 5/32*   (2006.01)
  *B32B 7/022*  (2019.01)

(52) U.S. Cl.
  CPC ............... *B32B 5/20* (2013.01); *B32B 5/245* (2013.01); *B32B 5/32* (2013.01); *B32B 7/022* (2019.01); *B32B 2260/021* (2013.01); *B32B 2260/046* (2013.01); *B32B 2262/0284* (2013.01); *B32B 2307/102* (2013.01); *B32B 2307/72* (2013.01); *B32B 2605/00* (2013.01)

(58) Field of Classification Search
  CPC ............... B32B 7/02; B32B 2260/021; B32B 2260/046; B32B 2262/0284; B32B 2262/02; B32B 2262/0253; B32B 2262/0261; B32B 2262/0276; B32B 2262/062; B32B 2262/065; B32B 2262/12; B32B 2307/102; B32B 2307/54; B32B 2307/718; B32B 2605/00; B32B 2605/08; B32B 5/08; B32B 5/18; B32B 3266/30; B04H 1/68; E04B 1/86
  See application file for complete search history.

(56) References Cited

FOREIGN PATENT DOCUMENTS

| | | | |
|---|---|---|---|
| DE | 10 2008 017 893 A1 | 10/2009 | |
| DE | 10 2013 104 715 A1 | 11/2014 | |
| DE | 102013104715 A1 * | 11/2014 | ......... C04B 38/0074 |
| EP | 0 995 667 A1 | 4/2000 | |
| EP | 0995667 B1 * | 11/2002 | ........... B32B 15/046 |
| EP | 2053080 A1 * | 4/2009 | .............. C08J 9/122 |
| EP | 2 251 231 A1 | 11/2010 | |
| JP | 4-351538 H | 12/1992 | |
| JP | 2004123090 A | 4/2004 | |
| KR | 10-2000-0029149 A | 5/2000 | |
| WO | 2016/062640 A1 | 4/2016 | |

OTHER PUBLICATIONS

Espacenet Translation of DE-102013104715-A1 (Year: 2020).*
Google Patent Translation of EP 2053080A1 (Year: 2021).*
Espacenet Translation of DE102008014261A1 (Year: 2021).*
International Search Report for International Application No. PCT/DE2017/100925 dated Feb. 22, 2018.

* cited by examiner

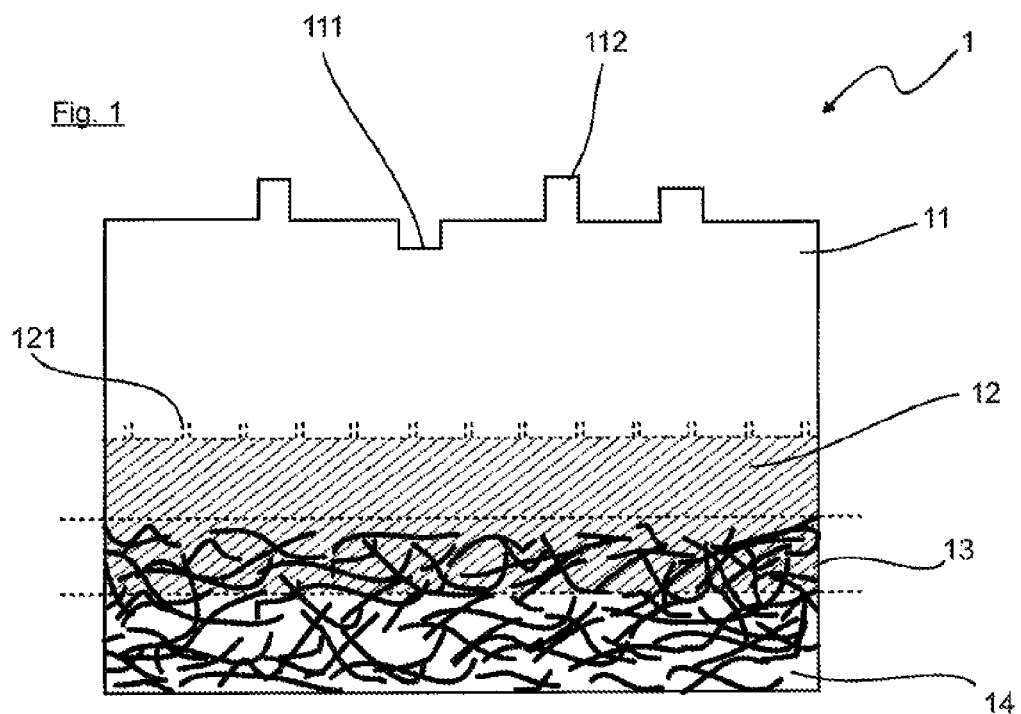
Fig. 1
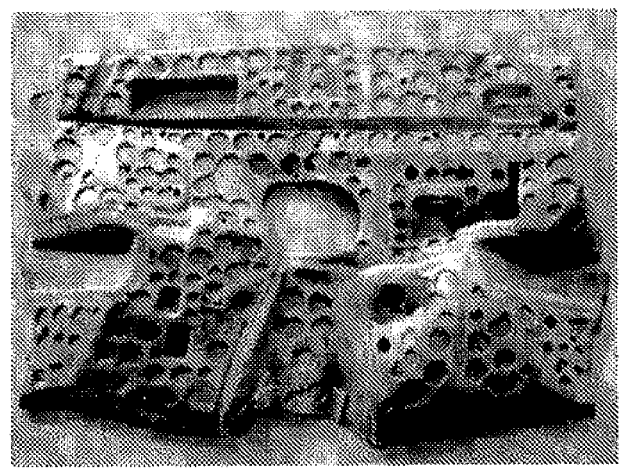
Fig. 2
Fig. 3
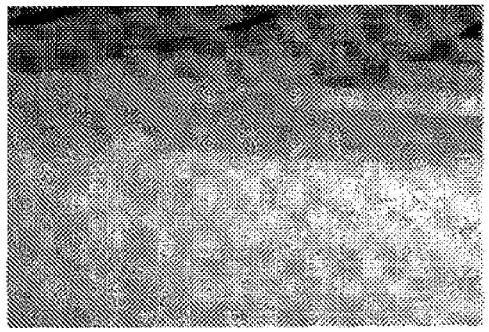
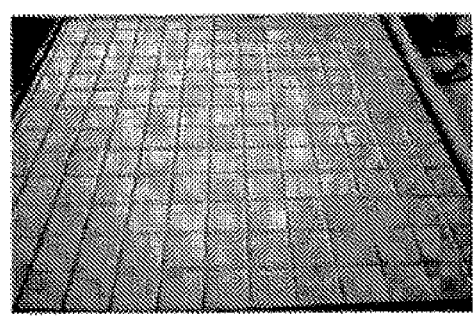
Fig. 4

Fig. 5
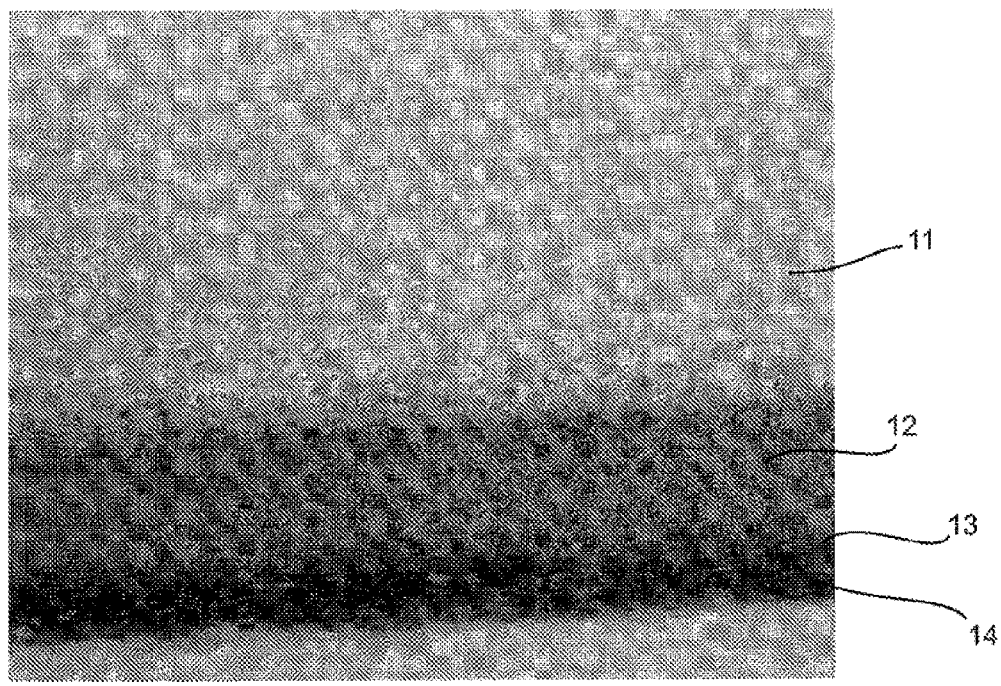
Fig. 6

ABSORBING SOUND INSULATION MOTOR TRIM ELEMENT

FIELD OF THE INVENTION

The invention relates to a method for producing an absorbing sound insulation motor vehicle trim element, which will be explained further in the following, comprising a four-layered structure made from a first foam layer, a second foam layer, a non-woven foam layer, and a non-woven fabric layer.

Further, the invention relates to an absorbing sound insulation motor vehicle trim element, which will be explained further herein, in which the absorption of sound is particularly high.

BACKGROUND OF THE INVENTION

From the prior art, different sound insulation elements and related preparation methods have been known, by means of which structures can be created, in particular, that can absorb sounds, for example, from the engine compartment, so that the sounds do not, or only to a little extent, get into the environment or into the passenger compartment of a motor vehicle.

In the prior art, a very large number of different compositions of sound insulation motor vehicle trim elements and of related preparation methods have been known, all of which use different approaches and are distinguished by small but essential differences. Hereinafter, the relevant prior art will be set forth.

From printed document DE 39 05 607 A1, a floor trim with a layer structure for preparing a sound insulation for vehicles is known, which consists of an acoustically effective layer made from a foam and at least one non-woven, in which at least one acoustically effective layer is introduced in the form of an intermediate sheet.

From printed document DE 10 2013 104 715 A1, a sound-insulating acoustic element is known that has at least one sound-absorbing non-woven layer, wherein said non-woven layer includes a foam flow regulating or foam flow inhibiting layer, and has a sound-absorbing foam layer, wherein the latter is bonded to the porous non-woven by back foaming with material locking, which penetration reaches to said foam flow regulating or inhibiting layer.

Further, from printed document JP 2004 123090 A, a floor mat for a car can be seen, wherein said floor mat has such a design that both sound insulation performance and sound absorption performance are achieved. This, a carpet layer and two or more layers of porous body layers have been combined, wherein a composite layer comprising a material that forms the adjacent porous body layer and a foam resin is provided between said porous body layers.

Further, from printed document EP 2 251 231 A1, a light and sound protection plate is known that has a porous layer and consists of a stable fibrous fabric sheet of a thermoplastic fiber provided between sound absorbers of foamed plastic, wherein the material of a staple fiber sheet and the foam material of another sound absorber form one or more sound insulating layers.

To conclude, two different foaming systems with different properties that are combined or can be combined further accordingly as set forth below are not known in the prior art.

The problems in the prior art essentially reside in the fact that it is currently not possible to prepare an inexpensive highly absorbing sound insulation element that meets the following requirements:

- sound absorption higher than that of the sound insulation motor vehicle trim elements known in the prior art;
- simple preparation and reduction of the individual components, so that a reduction of the cost during the production is possible, because to date, complex systems of at least three or four individual elements have been necessary, wherein such individual elements had to be combined at first in a difficult way, such as introducing a separation sheet into a non-woven, or the like; and
- low weight of the layer structure of a sound insulation motor vehicle trim element.

In general, the structures described in the prior art can be described by a multilayer structure, for which very complex methods and protection mechanisms are always necessary, so that one foam does not penetrate completely into a non-woven layer during back foaming.

In particular, it has been recognized that there are no highly absorbing sound insulation motor vehicle trim elements known in the prior art that can meet all of these requirements.

BRIEF SUMMARY OF THE INVENTION

The present invention is based on the object of providing an inexpensive and highly absorbing sound insulation element and a related preparation method, in which a very high acoustic effectiveness is to be achieved while the production is to be cost-effective, in which the simplicity of the preparation method by using only a few individual components is to be the main focus, but at the same time the effectiveness is to be increased and enhanced.

This object is achieved by a method for producing an absorbing sound insulation motor vehicle trim element according to the main claim, and an absorbing sound insulation motor vehicle trim element according to the other independent claim.

BRIEF DESCRIPTION OF THE DRAWINGS

The present invention is illustrated and described herein with reference to the drawing, in which like reference numbers denote like method steps and/or system components, respectively, and in which:

FIG. 1 is a schematic view of the disclosed absorbing sound insulation motor vehicle trim element;

FIG. 2 is an example of the surface structure of a finished absorbing sound insulation motor vehicle trim element;

FIG. 3 is an example of the rib structure of the surfaces of the first foam in a close-up view;

FIG. 4 is an example of the rib structure of the surfaces of the first foam according to FIG. 3 in a top view;

FIG. 5 is a first cross-section relating to the layer structure of an absorbing sound insulation motor vehicle trim element produced in an exemplary way;

FIG. 6 is a second cross-section relating to the layer structure of an absorbing sound insulation motor vehicle trim element produced in an exemplary way.

DETAILED DESCRIPTION OF THE INVENTION

Figure 7:
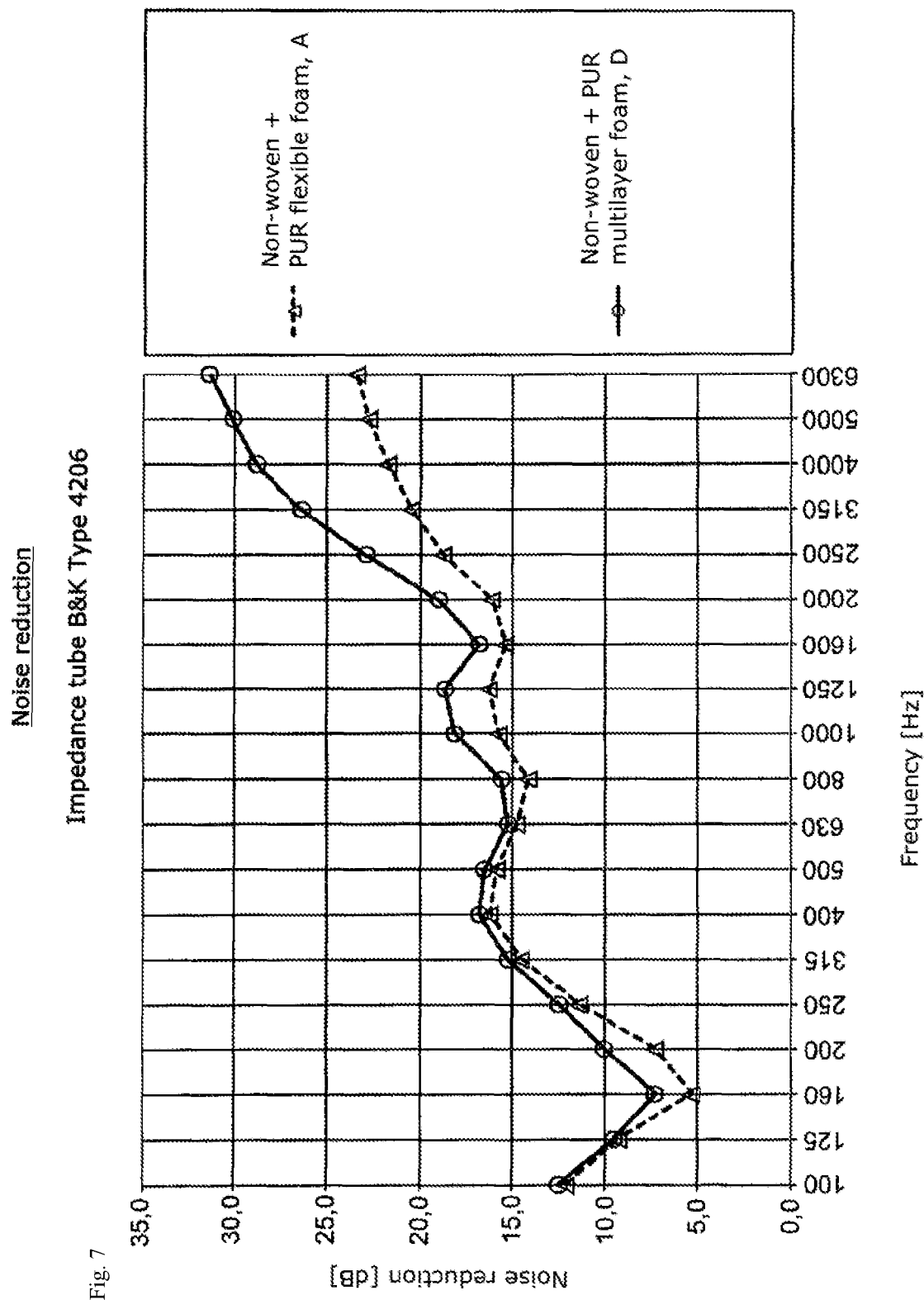
FIG. 7 shows the noise reduction of two foaming systems, comparing a system of non-woven fabric and PUR flexible foam with a non-woven fabric and PUR multilayer foam.

The method for producing an absorbing sound insulation motor vehicle trim element comprising a four-layer structure made from a first foam layer, a second foam layer, a non-woven foam layer, and a non-woven fabric layer includes the steps of:

I) providing a non-woven fabric having the thickness d;

II) compressing the non-woven fabric to a compressed thickness d';

III) foaming the second foam on a top surface of said compressed non-woven fabric layer by means of a first shaping foam half mold, wherein said second foam will diffuse into said non-woven fabric layer at least partially to form an intermediate layer, namely a layer with increased density, said intermediate layer consisting of a partial thickness of said non-woven fabric layer and said second foam;

IV) foaming the first foam on the top surface of the second foam remote from the non-woven fabric, wherein an outer surface structure is formed on the surface of the first foam remote from the second foam;

wherein during the foaming in step III) and/or IV), the formation/preparation of a rib, blister, projection and/or indentation surface structure is effected on the side of the respective foam (11, 12) remote from the respective non-woven fabric.

As an essential advantage, it has been found that during the foaming in step III) and/or IV) in the particularly preferred variant with the formation/preparation of a rib, blister, projection and/or indentation surface structure on the side of the respective foam remote from the respective non-woven fabric, the different properties of the first and second foaming systems surprisingly result in a significantly increased noise level reduction by the product, so that sound insulation is additionally possible for the first time. However, in addition to sound insulation, the structure of the component is also enhanced because of the different foams in combination with the prepared surface structure, so that these two advantages supplement each other synergistically against expectations.

The compressing of the non-woven fabric at the beginning prepares the non-woven fabric in such a way that the second foam, which is applied at first to the surface of the non-woven fabric, can diffuse into the non-woven fabric only partially rather than completely.

In addition, by using two foams having different properties, the requirements of improved sound absorption and reduced weight are met, but wherein the necessary strength of the component, albeit small, is ensured at the same time.

In particular, corresponding barrier layers and separation layers can be dispensed with.

In step III), the foaming can be affected in a first foaming mold. Further, the foaming in step IV) can be affected in a second foaming mold or in the first foaming mold with a replaced upper foam mold.

If the surface structure of the foaming system of the second foam is the same as the surface structure of the first foam, especially in the design with a rib structure, then the foaming of both the first and the second foaming systems can be affected in the same foaming mold. Only the gap size is changed when the first foaming system is foamed, i.e., by the thickness of the first foaming system. This represents a considerable cost advantage, since only one foaming mold is needed.

The highly absorbing sound insulation motor vehicle trim element, especially and preferably prepared by the method for producing a highly absorbing sound insulation motor vehicle trim element as herein disclosed and described, has a four-layer structure, wherein said structure comprises:

a first foam layer;
a second foam layer;
a layer with increased density; and
a non-woven fabric layer;

wherein the foam layers have different densities, loss factors and/or modulus of elasticity; and the foam adjacent the non-woven fabric layer has partially diffused into the non-woven fabric to form the layer with increased density;

wherein the surface of the first and/or second foam on the top surface of said first and/or second foam layer remote from the non-woven fabric has a rib, blister, projection and/or indentation structure.

In another preferred embodiment, the non-woven fabric consists of PET fibers, or the non-woven fabric consists of PET fibers and bicomponent ("BiCo") fibers, wherein the proportion of BiCo fibers in the non-woven fabric in the latter case is from 1 to 50% by weight, or from 8 to 20% by weight, or 10% by weight.

Further, the non-woven fabric may (a) include synthetic fibers selected from the group consisting of polyester fibers, especially poly(ethylene terephthalate) fibers, polyimide fibers, especially nylon 6 and/or nylon 66, polyolefin fibers, especially polypropylene fibers and/or polyethylene fibers, and acrylic fibers as well as fiber mixtures thereof including bicomponent fibers and multi-component fibers;

(b) include natural fibers selected from the group consisting of raw cotton fibers, hemp fibers, coconut fibers, kenaf fibers, jute fibers, and sisal fibers including mixtures thereof; or (c) contain mixtures of the synthetic fibers of group (a) and (b).

Further, in particular, the non-woven fabric may have a mass per unit area of from 400 g/m$^2$ to 1800 g/m$^2$, especially from 600 g/m$^2$ to 1200 g/m$^2$, and/or the layer with increased density may have a mass per unit area within a range of from 300 g/m$^2$ to 1500 g/m$^2$, and/or especially from 350 g/m$^2$ to 800 g/m$^2$.

In this respect, $CO_2$ loading of the PUR foam can be additionally employed. The loading can be effected in the isocyanate or in the polyol, and both may also be loaded. Further, there is a possibility of loading in the mixing head. Instead of $CO_2$ loading, nitrogen, pentane or compressed air may also be used.

Preferably, the first and/or second foam layer may contain bubble voids.

In a particularly preferred embodiment, the foaming systems consist of PUR. The first foaming system may have a density of from 40 to 90 g/l, a loss factor of 0.15 to 0.26, and/or a modulus of elasticity of from 45 to 180 kN/m$^2$. Further, the second foaming system may have a density of from 50 to 150 g/l, a loss factor of 0.15 to 0.55, and/or a modulus of elasticity of from 20 to 300 kN/m$^2$.

Within the meaning of this disclosure, the absorbing sound insulation motor vehicle trim element 1, especially because of its very high absorptivity with respect to sound insulation, can be described as a highly absorbing sound insulation motor vehicle trim element 1, or a corresponding method for producing a sound insulation motor vehicle trim element.

In the following Examples of the invention are described in some detail with reference to the accompanying Figures, wherein the latter are supposed to explain the invention rather than being limitative.

FIG. 1 shows a schematic Example of the disclosed absorbing sound insulation motor vehicle trim element 1;

FIG. 2 shows an Example of the surface structure of a finished absorbing sound insulation motor vehicle trim element 1;

FIG. 3 shows an Example of he rib structure of the surfaces of the first foam 11 in a close-up view;

FIG. 4 shows the Example of the rib structure of the surfaces of the first foam 11 according to FIG. 3 in a top view;

FIG. 5 shows a first cross-section relating to the layer structure of an absorbing sound insulation motor vehicle trim element 1 produced in an exemplary way; and FIG. 6 shows a second cross-section relating to the layer structure of an absorbing sound insulation motor vehicle trim element 1 produced in an exemplary way.

FIG. 1 shows a schematic Example of the disclosed absorbing sound insulation motor vehicle trim element 1.

This absorbing sound insulation motor vehicle trim element 1 has a four-layer structure 11, 12, 13, 14. The lowermost layer is a pure non-woven fabric layer 14. On top thereof, a layer with increased density 13 is formed in the composite, which is formed from a partial thickness of the non-woven fabric 14 and the second foam 12 provided on top thereof, wherein said second foam 12 has diffused, or been purposefully introduced, into the non-woven fabric layer 14 during the preparation thereof, wherein said diffusion takes place partially, i.e., not completely. The topmost and thus fourth layer is a first foam 11, which has properties different from those of the second layer 12.

Further and optionally, represented here by dotted lines, a rib structure 121 prepared on the surface of the second foam 12 is provided (cf. FIG. 4).

The surface of the first foam 11 has indentations 111 and projections 112.

Thus, the surface structure of the foaming systems 11 and 12 can be designed in either the same way or in different ways.

FIG. 2 shows an Example of the surface structure of a finished absorbing sound insulation motor vehicle trim element 1.

What is seen are necessary recesses and bulges as well as a surface structure provided with indentations 111 and bulges 112, as embodiments of depressions 111 and projections 112, respectively.

FIG. 3 shows an Example of the rib structure 121 of the surfaces of the first foam 11 in a close-up view.

In an exemplary way, a surface structure was prepared that has ribs 121 having a height of about 8 mm and a width of about 5 mm. Such ribs 121 have the property of providing sound insulation both at the surface of the first foam 11 and at the surface of the second foam 12, i.e., the boundary layer between the first foam 11 and the second foam 12, so that sounds from the engine compartment, for example, get into the passenger compartment with additional absorption caused by this property.

Further, FIG. 4 shows the Example of the rib structure 121 of the surface of the first foam 11 according to FIG. 3 in a top view.

It is pointed out here that the surface of the second foam 12 may be formed comparably as an intermediate product, for example, with a rib structure 121, wherein the first foam 11 is applied to this surface in the further process.

FIG. 5 shows a first cross-section relating to the layer structure of an absorbing sound insulation motor vehicle trim element 1 produced in an exemplary way.

The absorbing sound insulation motor vehicle trim element 1 consists of the four-layer structure that is well recognizable in this figure, i.e., from bottom to top, at first a non-woven fabric layer 14, on top thereof a layer with increased density 13, which proportionally consists of the non-woven fabric 14 and the second foam 12, which has partially diffused into the non-woven fabric 14, followed by the actual layer of the second foam 12, and the final topmost layer, namely the first foam 11.

This component, represented in an exemplary way, has a total thickness of 20 mm, wherein a PET fine fiber non-woven with 15% BiCo fibers was at first compressed or press-molded from a first thickness d=25 mm to a reduced thickness d'=5 mm. Subsequently, this compressed non-woven fabric layer 14 was placed into a foaming mold, and the foaming mold was closed, wherein, after the sealing of the mold was completed, foaming was effected by means of the second foaming system 12, with the properties of density 150 g/l, loss factor 0.34, modulus of elasticity 85 kN/m$^2$, on the non-woven fabric layer 14. Thus, the non-woven fabric layer 14 was back-foamed by means of the second foam 12, wherein the second foam 12 has partially diffused into the non-woven fabric layer 14 during the back-foaming.

After a reaction time of 50 s, the upper half of the foaming mold was replaced. The new top mold had a corresponding defined rib structure 121 with the properties of 50 mm×50 mm grid dimension, a rib height of 8 mm, and a rib width of 5 mm.

This was followed by foaming with the first foaming system 11 with the properties of density 75 g/l, a loss factor of 0.17, and a modulus of elasticity of 45 kN/m$^2$, wherein the second foam 12 has been back-foamed with the first foaming system 11.

After a reaction time of 60 s, the foaming mold was opened again, and the component 1 was removed and subsequently punched to the desired final shape.

During the foaming, the foam of the second foaming system 12 in part diffused into the compressed non-woven fabric layer to form a layer with a mass per unit area of 500 g/m$^2$, so that this layer 13 differs from the pure non-woven fabric layer 14, because the non-woven fabric layer 14 had a mass per unit area of 800 g/m$^2$.

FIG. 6 shows a second cross-section relating to the layer structure of an absorbing sound insulation motor vehicle trim element 1 produced in an exemplary way.

The disclosed layer structure can also be recognized in this cross-section, wherein the layers non-woven fabric layer 14, layer with increased density 13, second foam layer 12 and first foam layer 11 are again superimposed on one another.

Figure 8:
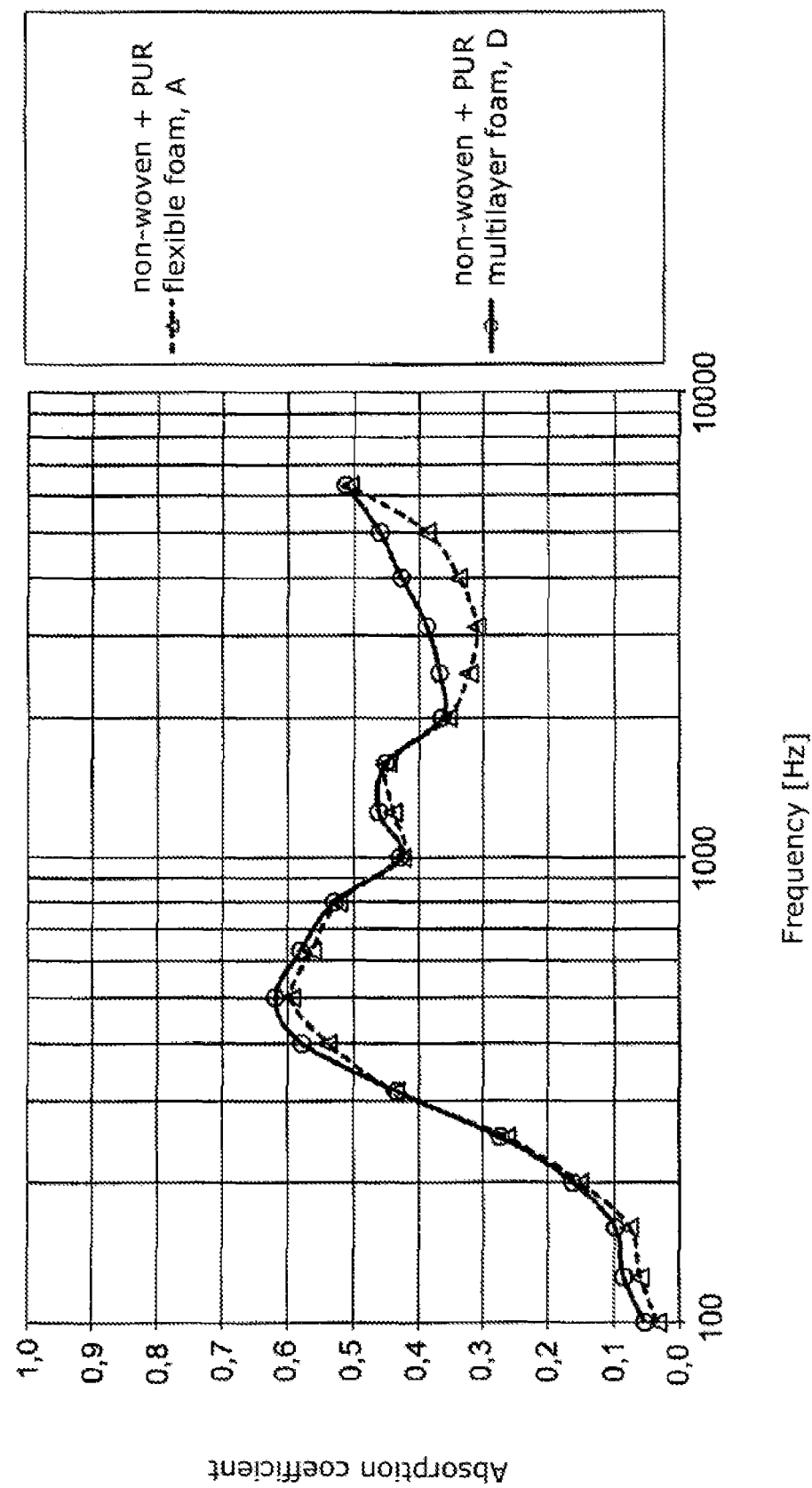
FIG. 8 shows the absorption of the two trim elements of FIG. 7, wherein the different behaviors of the two systems (A and D) are illustrated.

Further, corresponding measurements are shown in the FIGS. 7 and 8, which explain the invention further:

FIG. 7 shows the noise reduction (noise level reduction) of two foaming systems, comparing a system of non-woven fabric and PUR flexible foam as known in the prior art, A, with a non-woven fabric and PUR multilayer foam according to the invention, D.

It can be seen that the noise reduction by the trim element according to the invention (D) is significantly increased as compared to a simply back-foamed non-woven fabric (A) of the prior art.

Further, FIG. 8 shows the absorption of the two trim elements known from FIG. 7, wherein the different behaviors of the two systems (A and D) can be seen here.

LIST OF REFERENCE SYMBOLS 1 absorbing sound insulation motor vehicle trim element
11 first foam
111 indentations
112 protrusions
12 second foam
121 ribs
13 non-woven fabric layer with increased density
14 non-woven fabric

The invention claimed is:

1. An absorbing sound insulation motor vehicle trim element comprising a four-layer structure of a first foam layer, a second foam layer, a non-woven layer, and a non-woven fabric layer; wherein the absorbing sound insulation motor vehicle trim element is formed through a process comprising the following steps:
   I) providing a non-woven fabric layer having the thickness d;
   II) compressing the non-woven fabric layer to a compressed thickness d';
   III) foaming the second foam layer on a top surface of the compressed non-woven fabric layer by means of a first shaping foam half mold, wherein the second foam layer will diffuse into the non-woven fabric layer at least partially to form an intermediate layer with increased density, wherein the intermediate layer consists of a partial thickness of the non-woven fabric layer and the second foam layer;
   IV) foaming the first foam layer on a top surface of the second foam layer remote from the non-woven fabric layer;
   wherein the first foam layer has a density of from 40 to 60 g/l, a loss factor of 0.15 to 0.26, and a modulus of elasticity of from 45 to 180 kN/m2;
   wherein the second foam layer has a density of 40 to 90 g/l, a loss factor from 0.15 to 0.26, and a modulus of elasticity of 20 to 300 kN/m2;
      wherein the first and second foam layers have different densities, loss factors and/or modulus of elasticity;
      wherein the first foam layer and the second foam layer is loaded with $CO_2$;
   wherein
      the top surface of the first foam layer and/or the top surface of the second foam layer has a rib structure, wherein the rib structure provides sound insulation at a boundary between the first foam and the second foam layers;
      wherein the non-woven fabric layer consists of PET fibers and bicomponent fibers, wherein the proportion of the bicomponent fibers in the non-woven layer is 10% by weight.

2. The absorbing sound insulation motor vehicle trim element according to claim 1,
   characterized in that
   said non-woven fabric layer has a mass per unit area of 800 $g/m^2$, or a mass per unit area within a range of from 400 $g/m^2$ to 1800 $g/m^2$, or a mass per unit area within a range of from 600 $g/m^2$ to 1200 $g/m^2$;
   and/or
   the intermediate layer has a mass per unit area of 500 $g/m^2$, or a mass per unit area within a range of from 300 $g/m^2$ to 1500 $g/m^2$, or a mass per unit area within a range of from 350 $g/m^2$ to 800 $g/m^2$.

* * * * *